United States Patent
Sameer

(10) Patent No.: US 11,651,609 B2
(45) Date of Patent: May 16, 2023

(54) METHOD, APPARATUS, AND SYSTEM FOR MAPPING BASED ON A DETECTED PEDESTRIAN TYPE

(71) Applicant: HERE Global B.V., Eindhoven (NL)

(72) Inventor: Priyank Sameer, Mumbai (IN)

(73) Assignee: HERE GLOBAL B.V., Eindhoven (NL)

( * ) Notice: Subject to any disclaimer, the term of this patent is extended or adjusted under 35 U.S.C. 154(b) by 123 days.

(21) Appl. No.: 17/090,539

(22) Filed: Nov. 5, 2020

(65) Prior Publication Data

US 2021/0390291 A1 Dec. 16, 2021

Related U.S. Application Data

(60) Provisional application No. 63/037,304, filed on Jun. 10, 2020.

(51) Int. Cl.
| | |
|---|---|
| G05D 1/02 | (2020.01) |
| G01C 21/30 | (2006.01) |
| G06K 9/00 | (2022.01) |
| G06V 40/10 | (2022.01) |
| G06V 20/58 | (2022.01) |

(52) U.S. Cl.
CPC ........... *G06V 40/103* (2022.01); *G01C 21/30* (2013.01); *G05D 1/0246* (2013.01); *G06V 20/58* (2022.01)

(58) Field of Classification Search
CPC ...... G06V 40/103; G06V 20/58; G01C 21/30; G01C 21/3811; G01C 21/3837; G01C 21/3848; G05D 1/0246
See application file for complete search history.

(56) References Cited

U.S. PATENT DOCUMENTS

| | | | |
|---|---|---|---|
| 6,038,559 A | * 3/2000 | Ashby | G01C 21/32 701/410 |
| 9,324,006 B2 | 4/2016 | Vanhoucke et al. | |
| 9,805,474 B1 | * 10/2017 | Whiting | G08G 1/0129 |
| 10,311,451 B2 | 6/2019 | McCormack | |
| 2015/0227813 A1 | * 8/2015 | Vanhoucke | G06Q 30/02 382/100 |
| 2015/0365802 A1 | * 12/2015 | Barr | H04W 4/025 455/456.3 |
| 2016/0162747 A1 | 6/2016 | Singh et al. | |
| 2017/0124476 A1 | * 5/2017 | Levinson | G06V 20/58 |
| 2018/0260635 A1 | * 9/2018 | Al-Dahle | G05D 1/0214 |
| 2019/0384992 A1 | * 12/2019 | Tsunematsu | G06T 11/20 |

FOREIGN PATENT DOCUMENTS

| | | |
|---|---|---|
| CN | 107729804 A | 2/2018 |
| WO | 2017086058 A1 | 5/2017 |

* cited by examiner

*Primary Examiner* — Anne Marie Antonucci
*Assistant Examiner* — Connor L Knight
(74) *Attorney, Agent, or Firm* — Here Global B.V.; Jeffrey R. Moisan

(57) ABSTRACT

An approach is provided for mapping based on pedestrian type. The approach, for instance, involves processing image data to a determine the pedestrian type of at least one pedestrian depicted in the image data. The approach also involves determining a classification of a geographic zone based on the detected pedestrian type. The approach further involves generating a digital map representation of the geographic zone based on the classification.

8 Claims, 16 Drawing Sheets

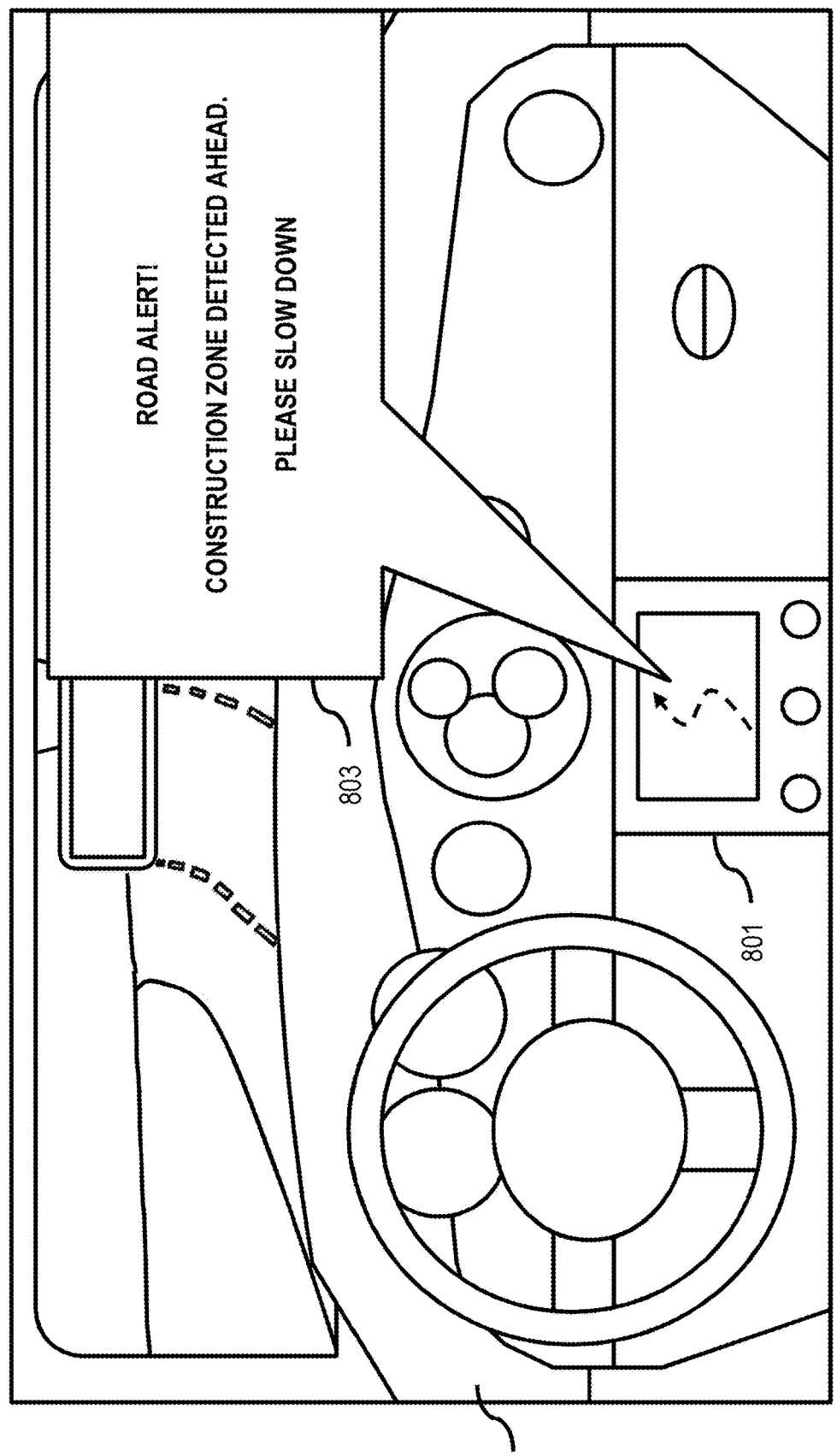

METHOD, APPARATUS, AND SYSTEM FOR MAPPING BASED ON A DETECTED PEDESTRIAN TYPE

RELATED APPLICATION

This application claims priority from U.S. Provisional Application Ser. No. 63/037,304, entitled "METHOD, APPARATUS, AND SYSTEM FOR MAPPING BASED ON A DETECTED PEDESTRIAN TYPE," filed on Jun. 10, 2020, the contents of which are hereby incorporated herein in their entirety by this reference.

BACKGROUND

Autonomous driving has quickly become an area of interest for vehicle manufacturers and location-based service providers. One area of interest is the use of computer vision to enable mapping and sensing of a vehicle's environment to support autonomous or semi-autonomous operation. At the same time, advances in available computing power has enabled increased use of computer vision across a growing variety of applications. As a result, service providers face significant technical challenges to leverage computer vision technology for advance mapping functions for improved autonomous driving and other related applications.

SOME EXAMPLE EMBODIMENTS

Therefore, there is a need for an approach for mapping based on computer vision systems.

According to one embodiment, a method for mapping based on a pedestrian type (e.g., detected using a computer vision system) comprises processing image data to a determine the pedestrian type of at least one pedestrian depicted in the image data. The method also comprises determining a geographic area, a route, or a combination thereof associated with the image data. The method further comprises determining a classification of the geographic area, the route, or a combination based on the detected pedestrian type. The method further comprises generating, verifying, and/or updating digital map data that represents the geographic area, the route, or a combination thereof and the classification.

According to another embodiment, an apparatus comprises at least one processor, and at least one memory including computer program code for one or more computer programs, the at least one memory and the computer program code configured to, with the at least one processor, cause, at least in part, the apparatus to process image data to a determine the pedestrian type of at least one pedestrian depicted in the image data. The apparatus is also caused to determine a geographic area, a route, or a combination thereof associated with the image data. The apparatus is further caused to determine a classification of the geographic area, the route, or a combination based on the detected pedestrian type. The apparatus is further caused to generate, verify, and/or update digital map data that represents the geographic area, the route, or a combination thereof and the classification.

According to another embodiment, a non-transitory computer-readable storage medium carries one or more sequences of one or more instructions which, when executed by one or more processors, cause, at least in part, an apparatus to process image data to a determine the pedestrian type of at least one pedestrian depicted in the image data. The apparatus is also caused to determine a geographic area, a route, or a combination thereof associated with the image data. The apparatus is further caused to determine a classification of the geographic area, the route, or a combination based on the detected pedestrian type. The apparatus is further caused to generate, verify, and/or update digital map data that represents the geographic area, the route, or a combination thereof and the classification.

According to another embodiment, an apparatus comprises means for processing image data to a determine the pedestrian type of at least one pedestrian depicted in the image data. The apparatus also comprises means for determining a geographic area, a route, or a combination thereof associated with the image data. The apparatus further comprises means for determining a classification of the geographic area, the route, or a combination based on the detected pedestrian type. The apparatus further comprises means for generating, verifying, and/or updating digital map data that represents the geographic area, the route, or a combination thereof and the classification.

According to another embodiment, a method comprises processing image data to a determine the pedestrian type of at least one pedestrian depicted in the image data. The method also comprises determining a classification of a geographic zone based on the detected pedestrian type. The method further comprises generating a digital map representation of the geographic zone based on the classification.

According to another embodiment, an apparatus comprises at least one processor, and at least one memory including computer program code for one or more computer programs, the at least one memory and the computer program code configured to, with the at least one processor, cause, at least in part, the apparatus to process image data to a determine the pedestrian type of at least one pedestrian depicted in the image data. The apparatus is also caused to determine a classification of a geographic zone based on the detected pedestrian type. The apparatus is further caused to generate a digital map representation of the geographic zone based on the classification.

According to another embodiment, a non-transitory computer-readable storage medium carries one or more sequences of one or more instructions which, when executed by one or more processors, cause, at least in part, an apparatus to process image data to a determine the pedestrian type of at least one pedestrian depicted in the image data. The apparatus is also caused to determine a classification of a geographic zone based on the detected pedestrian type. The apparatus is further caused to generate a digital map representation of the geographic zone based on the classification.

According to another embodiment, an apparatus comprises means for processing image data to a determine the pedestrian type of at least one pedestrian depicted in the image data. The apparatus also comprises means for determining a classification of a geographic zone based on the detected pedestrian type. The apparatus further comprises for generating a digital map representation of the geographic zone based on the classification.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 8 is a diagram of an example user interface for presenting information based on a pedestrian type classification of a geographic zone, according to one embodiment;

DESCRIPTION OF SOME EMBODIMENTS

Examples of a method, apparatus, and computer program for mapping based on pedestrian type are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. As used herein, the term "pedestrian" refers to any person traveling on foot or using a conveyance other than a motor vehicle (e.g., cars, buses, trains, etc.). For example, pedestrian conveyances include, but are not limited to, conveyances propelled by human power (e.g., bicycles, scooters, skateboards, wheelchairs, carts, strollers, etc.) and/or electric or self-powered versions of the same.

Figure 1:
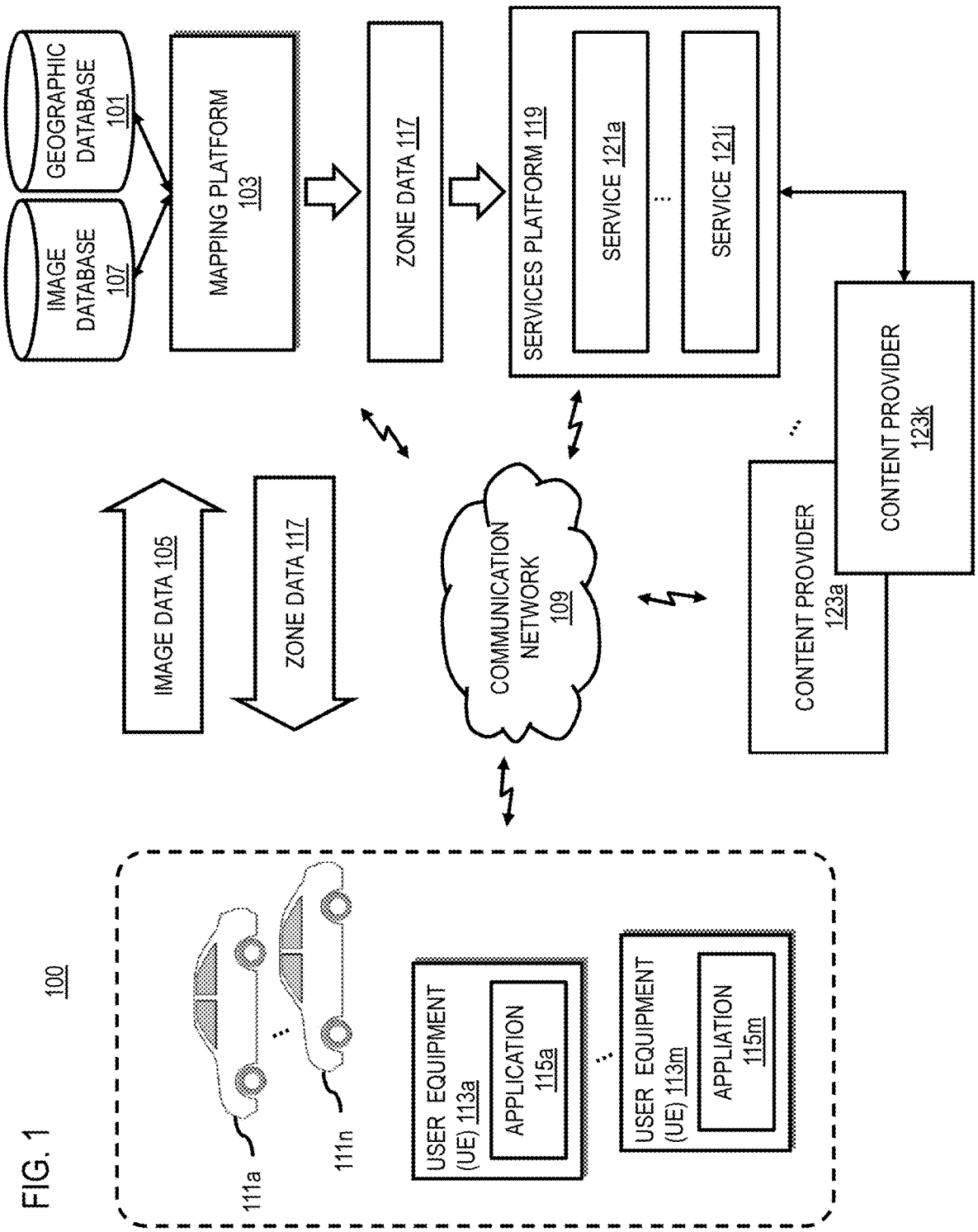
FIG. 1 is a diagram of a system capable of mapping based on a pedestrian type, according to one embodiment.

FIG. 1 is a diagram of a system 100 capable of mapping based on a pedestrian type, according to one embodiment. As advanced mapping-related functions (e.g., such as but not limited to autonomous driving) are becoming more widespread, mapping different classifications or zone types to geographic areas is one factor in providing modern digital maps and related location-based services. For example, geographic areas, routes, etc. can be classified as pedestrian zones, industrial zones, school zones, works zones, etc. Zones, for instance, refer to any geographic area, route, feature, etc. that can be delineated (e.g., within a geographic boundary, along a geographic route/path, etc.) that has been assign one or more classifications or categories that are descriptive or characteristic of the zone (e.g., any classification or category assigned by a map maker). These classifications, for instance, can help autonomous vehicles identify the type of zone in which they are traveling and operate within parameters that improve safety while in the zone (e.g., reducing speeds in school zones or zones associated with children). Traditionally, classification of geographic areas into different types of zones have been determined using manual identification and verification. However, these manual approaches have not been cost effective because of high manual labor costs, thereby limiting how much of the map area is mapped with zones and how often previously mapped zones can be updated. Accordingly, service providers face significant technical challenges to enable automated detection and classification of zones for mapping.

To address these technical challenges, the system 100 of FIG. 1 introduces a capability to generate more map zones that are classified or categorized by capturing the type of pedestrians through imagery of the geographic area. In one embodiment, the pedestrian type can be identified using computer vision to automatically identify the dress code (e.g., type of clothes being worn) and/or other computer vision detectable characteristics of visible pedestrians. The system 100 can then combine the pedestrian type, geographic locations/areas/routes/etc. at which the pedestrian type is detected, and/or digital map features (e.g., points or interest information) to generate, update, and/or verify digital map data (e.g., as stored in a geographic database 101). In other words, the system 100 can process image data to identify pedestrian types associated with a given geographic location, area, route, etc. and then use the identified pedestrian type to classify a geographic zone and to embed the zone classification into digital map data (e.g., the geographic database 101).

Although the various embodiments described herein are discussed with respect determining zones based on analyzing imagery for pedestrians, it is contemplated that the various embodiments can also be used to analyze the dress code and/or other visually detectable characteristics of people in general (e.g., both pedestrians and non-pedestrians) that are captured in the imagery. The identified "people type" can then be determined analogously to determining pedestrian types according to the various embodiments to classify a corresponding geographic zone, area, route, location, map feature, etc.

In one embodiment, the system 100 includes a mapping platform 103 to process image data 105 (e.g., stored in an image database 107 or collected in real-time via a communication network 109) using deep vision learning methods or equivalent to identify visible pedestrian types. The image data 105, for instance, can include street-level imagery (or equivalent imagery) captured by camera-equipped vehicles 111a-111n (also collectively referred to as vehicles 111) and/or other camera-equipped user equipment (UE) devices 113a-113m (e.g., also collectively referred to as UEs 113 such as smartphone devices or equivalent) executing respective applications 115a-115m (also collectively referred to as applications 115).

In one embodiment, the deep vision learning system can use a predictive algorithm (e.g., a predictive machine learning model such as, but not limited to, a convolutional neural network) which uses pedestrian characteristics (e.g., detected from image data 105) as input features to predict a pedestrian type (e.g., office-going pedestrian, school pedestrian, senior citizen pedestrian, handicapped pedestrian, etc.). The system 100 can then determine a zone classification (e.g., zone data 117) of a corresponding geographic location, area, route, etc. based on the predicted pedestrian type. By way of example, the pedestrian characteristics for predicting the pedestrian type can include, but is not limited to, any of one or more of the following examples:

Nature of Pedestrian (e.g., man/woman, child/adult/senior citizen, physical disability, etc.);

Type of dress code (e.g., based on detected clothes, shoes, accessories, etc. worn by the identified pedestrian);

Types of POIs, places, map features, etc. within a threshold proximity of the identified pedestrian (e.g., based map data associated with the location of the identified pedestrian);

Types of vehicles (e.g., cycles, carts, cars, buses, etc.) within a threshold proximity of the identified pedestrian;

Time information (e.g., work, school, event, etc. schedules).

Using one or more of the above factors (or other features detectable from pedestrian imagery), the system 100 can detect the type of pedestrian and embed the pedestrian types and/or zone classification (e.g., zone data 117 based on the zone types in digital map data (e.g., the geographic database 101).

Figure 2:
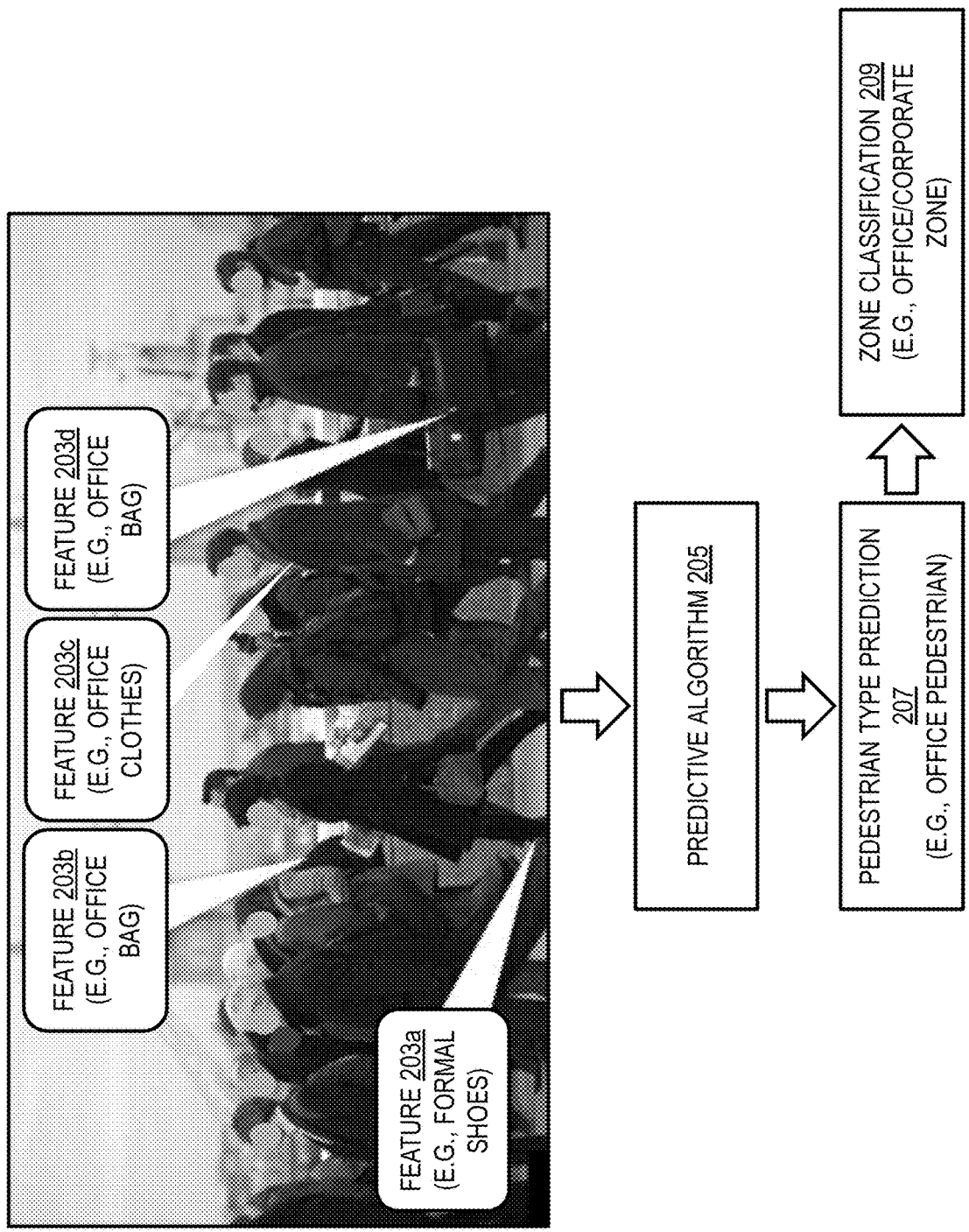
FIG. 2 is diagram illustrating example image of pedestrians identified with a pedestrian type, according to one embodiment.

FIG. 2 illustrates an example image 201 captured at a location for which a zone classification is to be determined. In this example, the image 201 depicts multiple pedestrians. A computer vision system has been used to process the images to identify clothing and other items being worn the pedestrians. This computer vision analysis has identified several pedestrian features 203a-203d that can be used to classify the pedestrian type of at least some of the depicted pedestrians. For example, the computer vision system (e.g., using deep neural networks) has identified feature 203a as formal shoes being worn by a pedestrian, feature 203b as an office bag worn by a pedestrian, feature 203c as office clothes worn by a pedestrian, and feature 203d as another office bag held by a pedestrian. The system 100 can feed these detected features 203a-203d into a predictive algorithm 205 (e.g., trained machine learning model) to predict the pedestrian types visible in the image. In this case, the predictive algorithm 205 generates a pedestrian type prediction 207 of the one or more of the pedestrians depicted in the image 201 that identifies the pedestrians as office worker pedestrians.

In one embodiment, the predictive algorithm 205 can also or instead directly predict the zone classification for a geographic area associated with the image 201 (e.g., based on a location tag or other recorded location data of the image 201). For example, because most of the pedestrians depicted in the image 201 are office worker pedestrians (e.g., based on pedestrian type prediction 207), the zone classification 209 for the corresponding area can be determined to be an office/corporate zone. The system 100 (e.g., via the mapping platform 103) can then record the resulting classification as zone data 117. In one embodiment, the zone data 117 can be embedded in the digital map data of the geographic database 101. By adding the zone data 117 automatically determined from pedestrian imager according to the embodiments described herein, the customers and/or user of the geographic database 101 can be more aware of the area that they are travelling.

Figure 3:
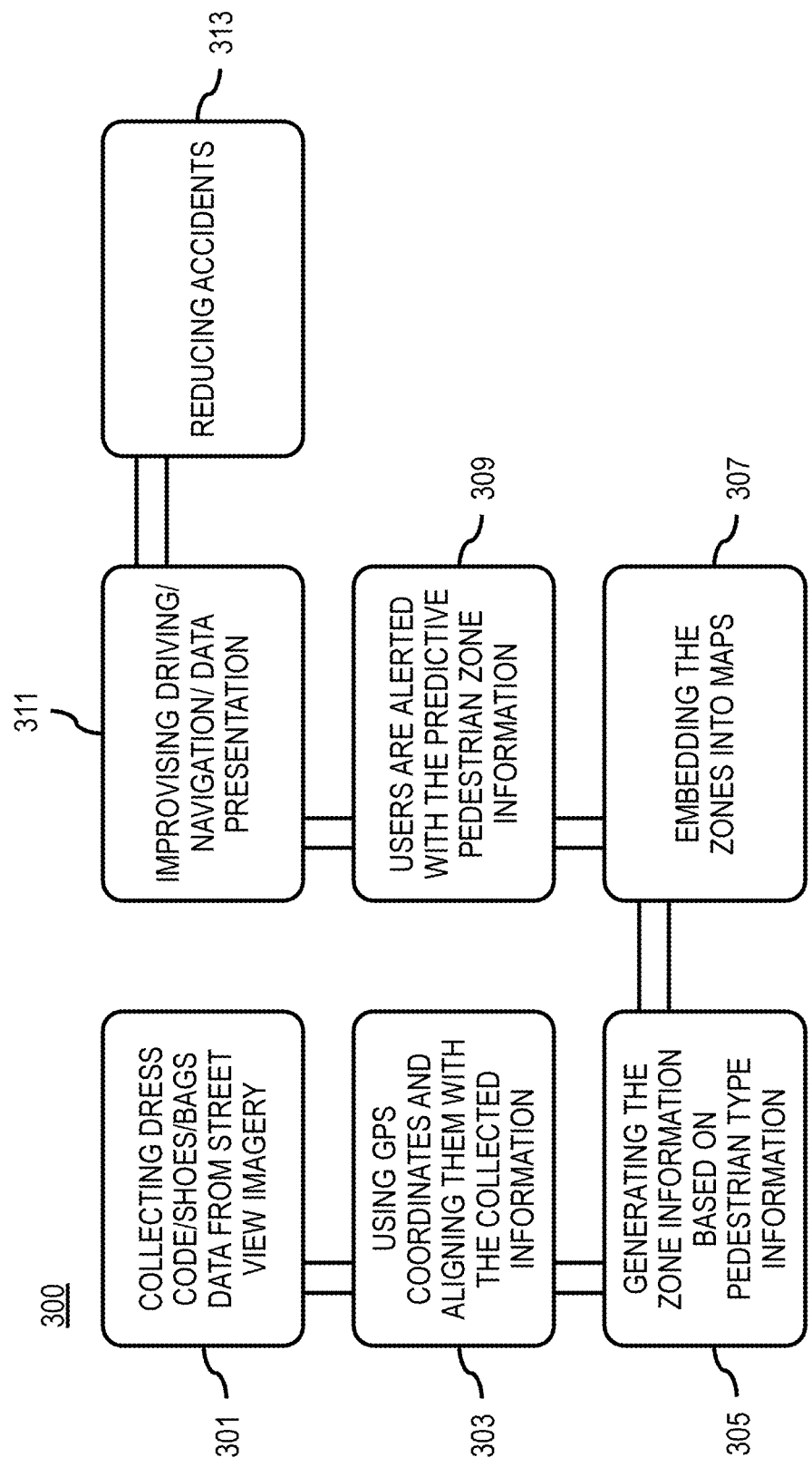
FIG. 3 is a diagram summarizing a process for mapping based on a pedestrian type, according to one embodiment.

FIG. 3 is a diagram summarizing a process 300 for mapping based on a pedestrian type, according to one embodiment. At block 301, the system 100 collects data on that can be used to predict a pedestrian type of pedestrians depicted in an image. By way of example, the data can include, but is not limited to, dress code data (e.g., clothes worn, shoes worn, accessories worn, etc.) that is determined from imagery (e.g., image data 105 such as but not limited to street view imagery). The system 100 then use location coordinates (e.g., Global Positioning Satellite (GPS) or equivalent coordinates) associated with the imagery or features visible in the imagery (block 303). The location coordinates are then aligned with the collected information. The location-aligned information can be used for pedestrian type prediction and generating zone information (e.g., zone data 117) based on the predicted pedestrian type (block 305). The resulting zone data 117 can be embedded into digital map data (e.g., the geographic database 101) (block 307). This zone data 117 can be used to create, update, and/or verify the digital map data.

After the digital map data is create, updated, and/or verified according to the embodiments described herein, the zone data 117 can be provided to the costumers or any other user. For example, the zone data 117 can be provided back to the vehicles 111, UEs 113, and/or other equivalent users as raw map data or as processed service information (e.g., provided by a services platform 119, services 121*a*-121*j* of the services platform 119—also collectively referred to as services 121, and/or content providers 123*a*-123*k*—also collectively referred to as content providers 123). More specifically, the system 100 can provide the zone data 117 (e.g., the predictive pedestrian zone information) to user via an alert or warning of an upcoming zone (block 309). In response, the receiving users (e.g., vehicles 111, UEs 113, etc.) can improvise or change driving behavior, navigation behavior, data that is to be presented to a user, or a combination there based on the zone data 117 (block 311), thereby increasing safety such as, but not limited to, reducing accidents (block 313).

The zone data 117 determined from automatically predicted pedestrian type information can be used for any service or application where such data is used to improve safety or provide service functions such in the example cases listed below:

Autonomous driving;

Traveling in areas with heavy traffic;

Traveling in accident prone areas;

Prediction of school zones, play zones, and/or any other safety-sensitive zone in advance;

Less dependency on a need to detect sign boards to infer zone information;

Safety for certain potentially vulnerable groups (e.g., senior citizens, disabled people, etc.) who are driving vehicles; and Traveling on highways (e.g., advanced prediction of work zones, construction zones, etc.).

Figure 4:
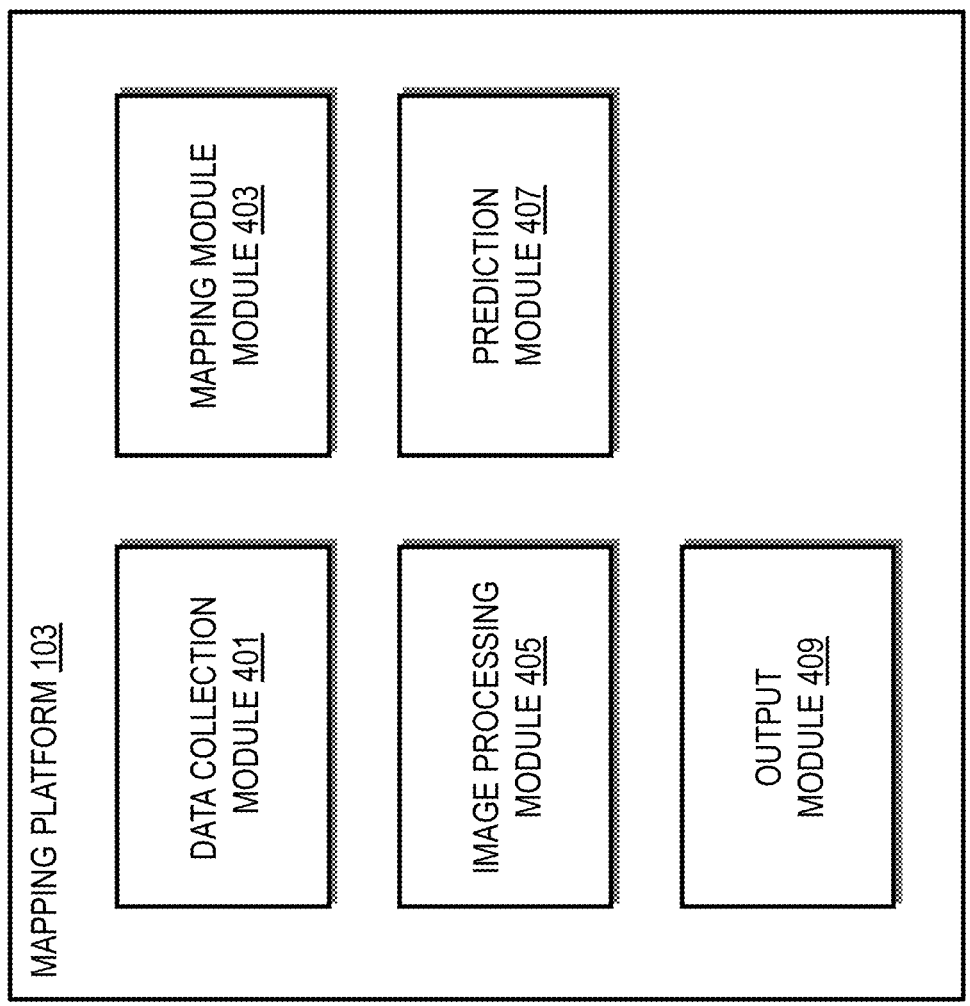
FIG. 4 is a diagram of a mapping platform capable of mapping based on a pedestrian type, according to one embodiment.

In one embodiment, as shown in FIG. 4, the mapping platform 103 of the system 100 includes one or more components for providing mapping of geographic zones based identified pedestrian types according to the various embodiments described herein. It is contemplated that the functions of the components of the mapping platform 103 may be combined or performed by other components of equivalent functionality. As shown, in one embodiment, the mapping platform 103 includes a data collection module 401, a mapping module 403, an image processing module 405, a prediction module 407 (e.g., including a predictive algorithm for identifying pedestrian types and/or classifying geographic zones, locations, areas, routes, etc.), and an output module 409. The above presented modules and components of the mapping platform 103 can be implemented in hardware, firmware, software, or a combination thereof. Though depicted as a separate entity in FIG. 1, it is contemplated that the mapping platform 103 may be implemented as a module of any of the components of the system 100 (e.g., a component of the services platform 119, services 121, content providers 123, vehicles 111, UE 113, and/or the like). In another embodiment, one or more of the modules 401-409 may be implemented as a cloud-based service, local service, native application, or combination thereof. The functions of the mapping platform and modules 401-409 are discussed with respect to FIGS. 5-8 below.

Figure 5:
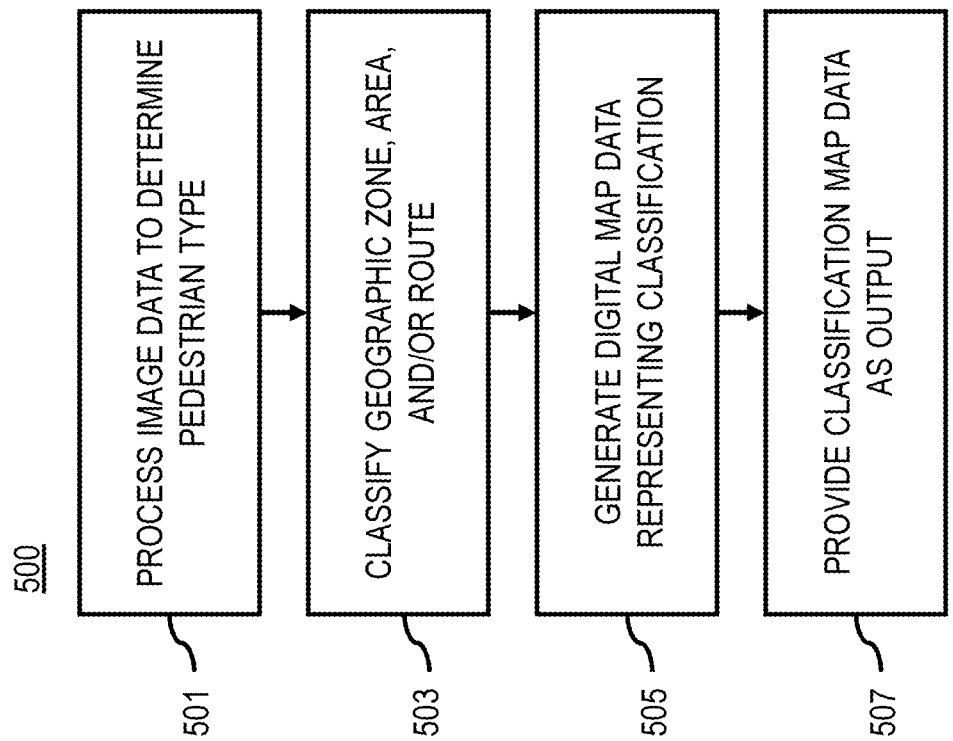
FIG. 5 is a flowchart of a process for mapping based on a pedestrian type, according to one embodiment.
Figure 11:
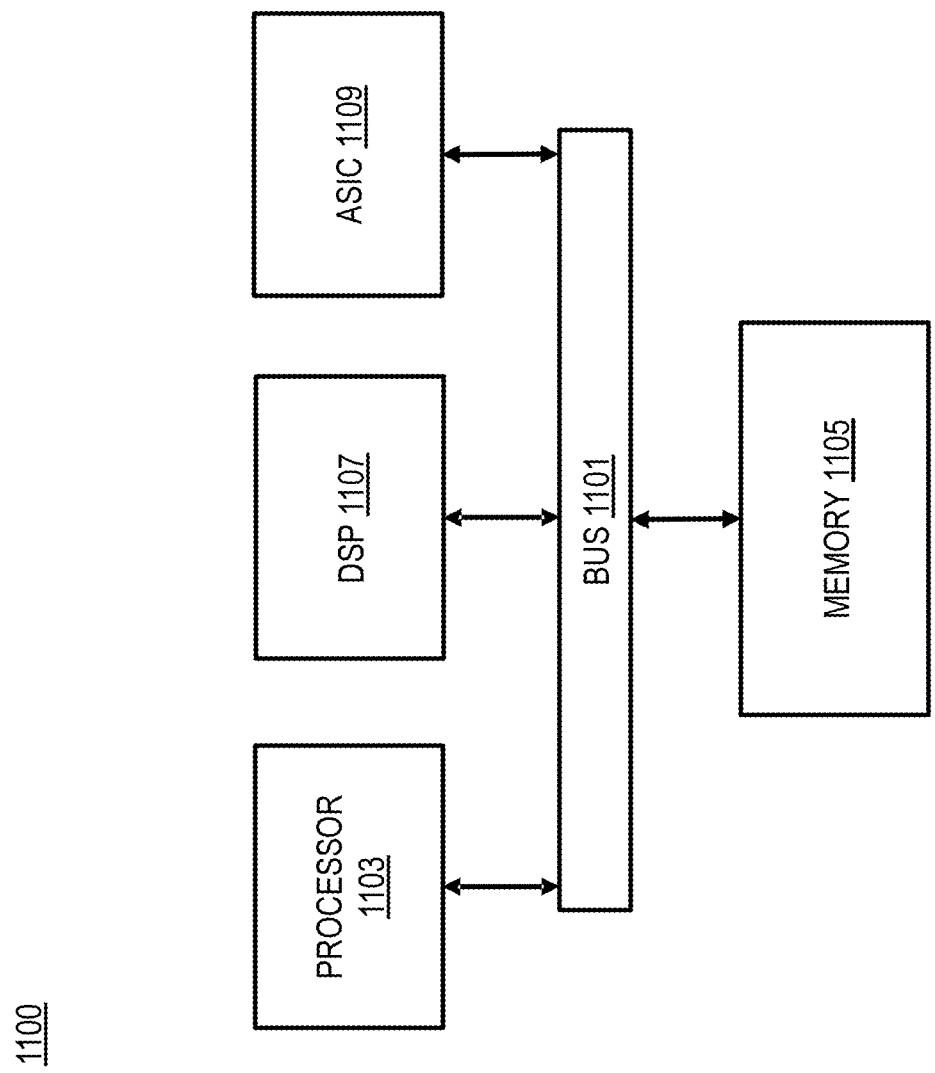
FIG. 11 is a diagram of a chip set that can be used to implement an embodiment.

FIG. 5 is a flowchart of a process for mapping based on a pedestrian type, according to one embodiment. In various embodiments, the mapping platform and/or any of the modules 401-409 may perform one or more portions of the process 500 and may be implemented in, for instance, a chip set including a processor and a memory as shown in FIG. 11. As such, the data mapping platform 103 and/or any of the modules 401-409 can provide means for accomplishing various parts of the process 500, as well as means for accomplishing embodiments of other processes described herein in conjunction with other components of the system 100. Although the process 500 is illustrated and described as a sequence of steps, it is contemplated that various embodiments of the process 500 may be performed in any order or combination and need not include all of the illustrated steps.

In step 501, the image processing module 405 processes image data 105 to a determine the pedestrian type of at least one pedestrian depicted in the image data. For example, the image processing module 405 can interact with the data collection module 401 to collect the image data 105 from vehicles 111 and/or UEs 113 traveling within a geographic area that is to be mapped for zone classifications. The vehicles 111 and/or UEs 113 can be customer vehicles or devices, or can be part of a fleet of mapping vehicles and/or devices operated by a mapping service provider. Generally, such vehicles 111 and/or UEs 113 capture street level imagery for processing by the mapping platform 103. However, it is contemplated that any other type of imagery (e.g., aerial imagery, satellite imagery, etc.) are also applicable to the various embodiments described herein.

In one embodiment, the image processing module 405 can process the image data 105 using any automated means to extract features that can be used for pedestrian type prediction. For example, the image processing module 405 can use deep vision learning or equivalent computer vision means to identify pedestrians, pedestrian features, and/or other visible objects from which pedestrian types can be predicted. Deep vision learning includes, for instance, the use of convolutional neural networks or equivalent to recognize objects (e.g., pedestrians, clothes worn by the pedestrians, objects associated with pedestrians, etc.) in images, understand the semantic meaning of images, and segment images according to these semantic categories.

In one embodiment, a trained machine learning model used in deep vision learning can be trained to classify image data 105 as depicting one or more pedestrian features that can be used to predict a pedestrian type or to directly predict the pedestrian type with the image data 105 as an input. During training, a model training component feeds extracted pedestrian features from the image data 105 into a machine learning model (e.g., neural network) to compute a predicted pedestrian type using an initial set of model parameters. The model training component then compares the predicted pedestrian type to ground truth labels in the training data. The model training component computes a loss function representing an accuracy of the predictions for the initial set of model parameters. The model training component then incrementally adjusts the model parameters until the model minimizes the loss function (e.g., achieves a target prediction accuracy). In other words, a "trained" machine learning model for predicting a pedestrian type and/or related objects is a machine learning model with parameters (e.g., coefficients, weights, etc.) adjusted to make accurate predictions with respect to the ground truth data.

Figure 6A:
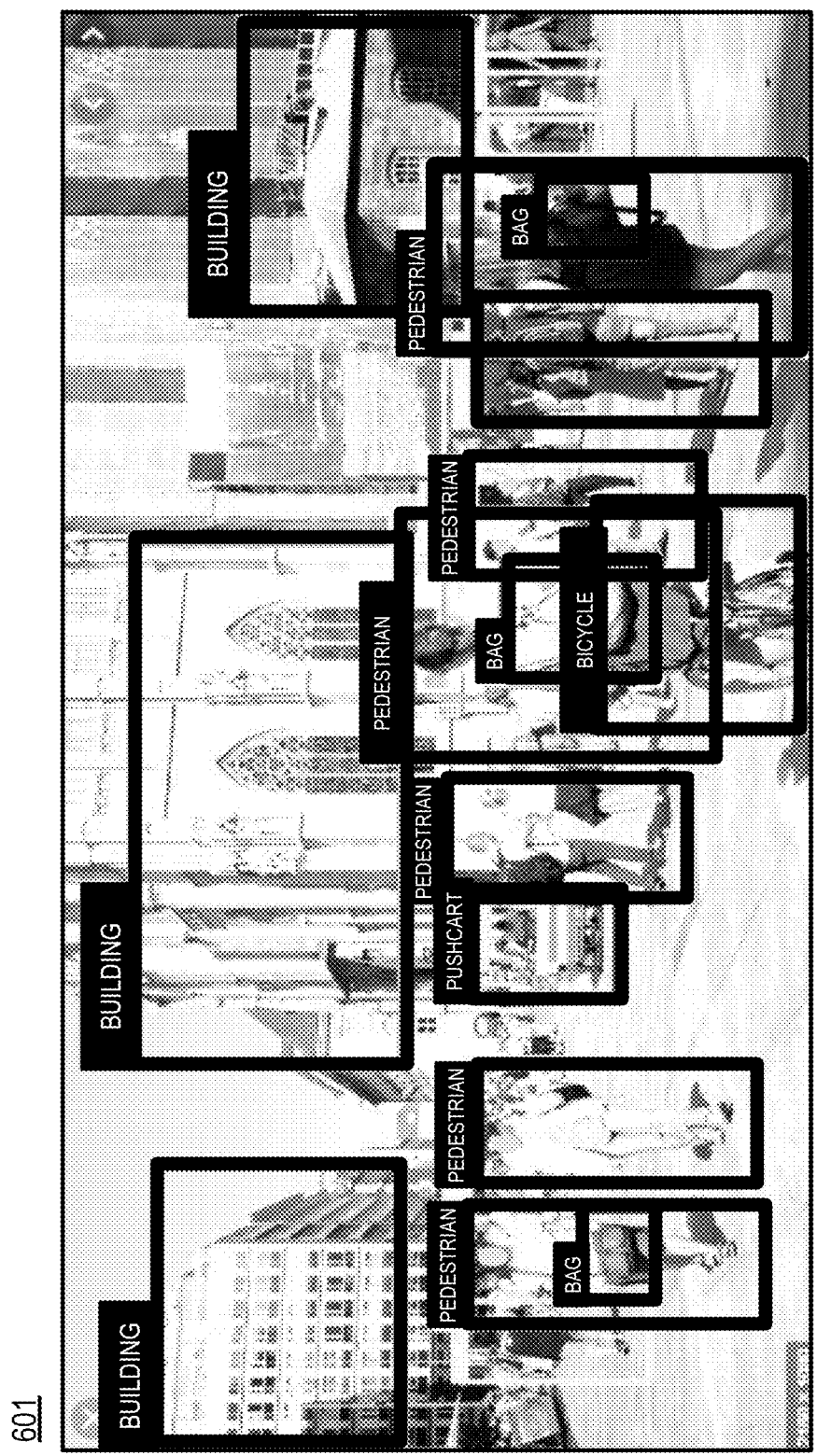
FIGS. 6A-6E are diagrams of example images processed to identify pedestrians and/or pedestrian types, according to one embodiment.

FIGS. 6A-6E are diagrams of example images processed to identify pedestrians and/or pedestrian types, according to one embodiment. FIG. 6A illustrates an example image 601 depicting a street level of an urban area. The image processing module 405 process the image with a trained object recognition machine learning model to identify pedestrians and related object. As shown, the image processing module 405 has drawn bounding boxes surrounding the recognized objects: pedestrians, pedestrian worn accessories (e.g., bags), pedestrian conveyances (e.g., bicycles), as well as other related objects (e.g., a pushcart). In one embodiment, the image processing module 405 can perform more specific object recognition to identity the types of clothes (e.g., a dress code) worn by the detected pedestrians, or the types of accessories (e.g., work bags, back packs, shopping bags, etc.) worn or carried by the pedestrians. In this example, the pedestrians have been detected as wearing casual clothes. The image processing module 405 can be trained or configured to detect any feature of the image 601 relevant to predicting a pedestrian type.

In one embodiment, the pedestrian and other image features identified by the image processing module 405 can be feed into the prediction module 407 to predict pedestrian types. As described above, the image-identifiable features produced by the image processing module and provided to the prediction module 407 include but are not limited to:

Nature of pedestrian (e.g., man/woman, child/adult/senior citizen, physical disability, etc.); and Type of dress code (e.g., based on detected clothes, shoes, accessories, etc. worn or carried by the identified pedestrian); and Types of vehicles (e.g., cycles, carts, cars, buses, etc.) within a threshold proximity of the identified pedestrian.

The image-identifiable features can be combined with other input features associated with the image data 105, geographic area/features associated with a location corresponding to the image data, and/or other contextual information. Examples of these additional feature include but are not limited to:

Types of POIs, places, map features, etc. within a threshold proximity of the identified pedestrian (e.g., based map data associated with the location of the identified pedestrian);

Contextual information such as but not limited to: time information (e.g., work, school, event, etc. schedules); weather information; activity information, etc.; and Probe or trajectory data (e.g., a sequence of timestamped location data points—e.g., <timestamp, latitude, longitude>) collected from one or more location sensors of the vehicles 111 and/or UEs 113 of the pedestrians.

It is noted that the features listed above are provided by way of illustration and not as limitations. It is contemplated that any feature (image-identifiable or otherwise) that is relevant to predicting pedestrian type may be applicable to the various embodiments described herein. The additional features listed above may also be image-identifiable if those features are visible in the image data. If not, the prediction module 407 can determine the feature from a database (e.g., the geographic database), metadata associated with the image data 105, and/or equivalent data source.

Figure 6B:
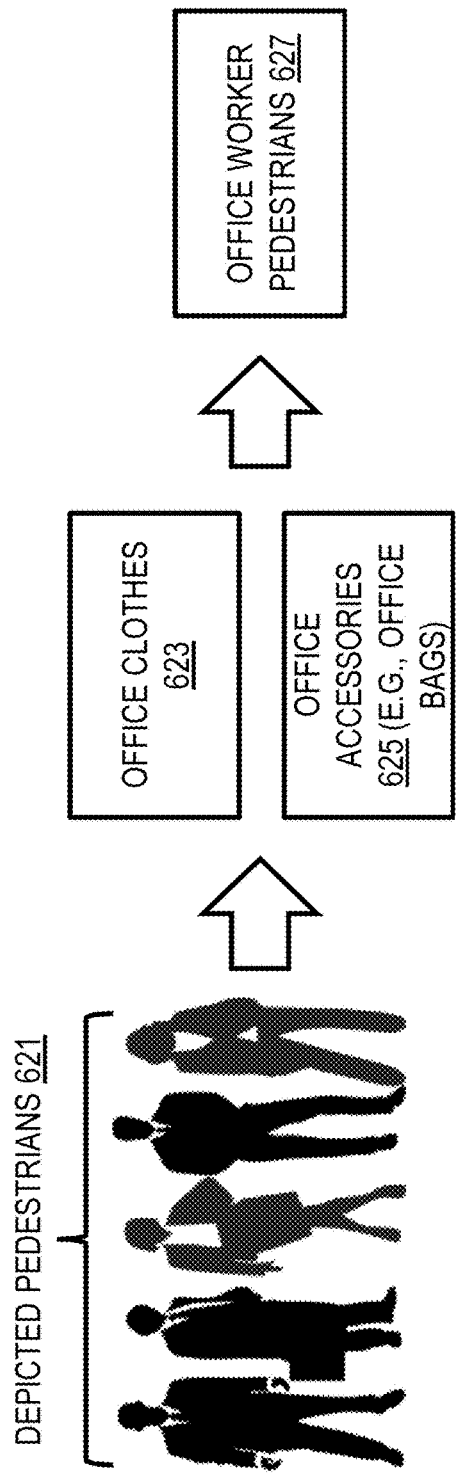
Figure 6C:
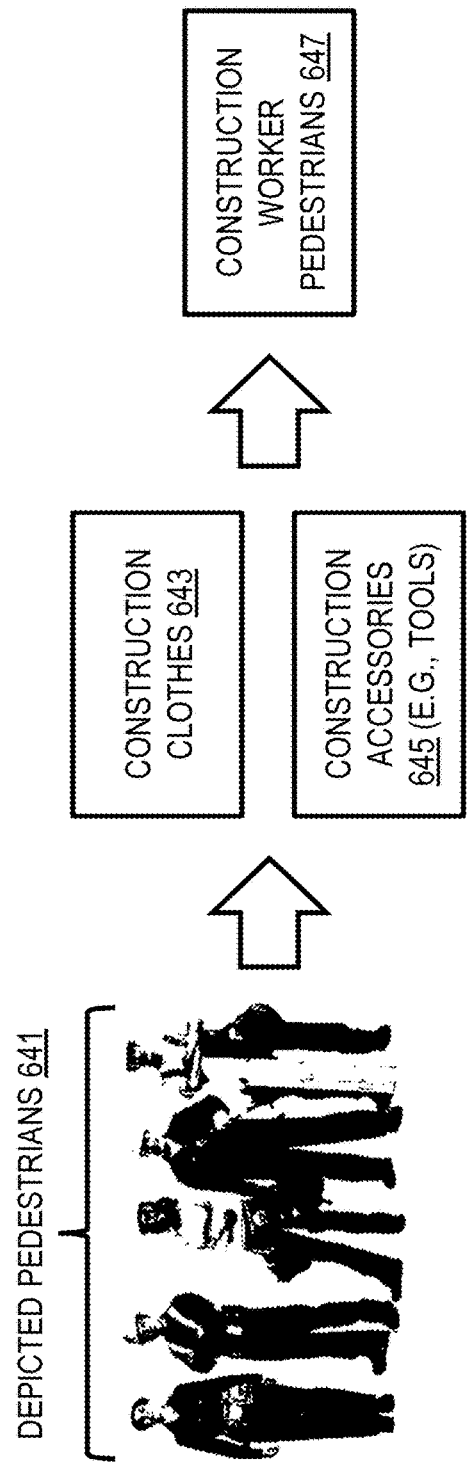
Figure 6D:
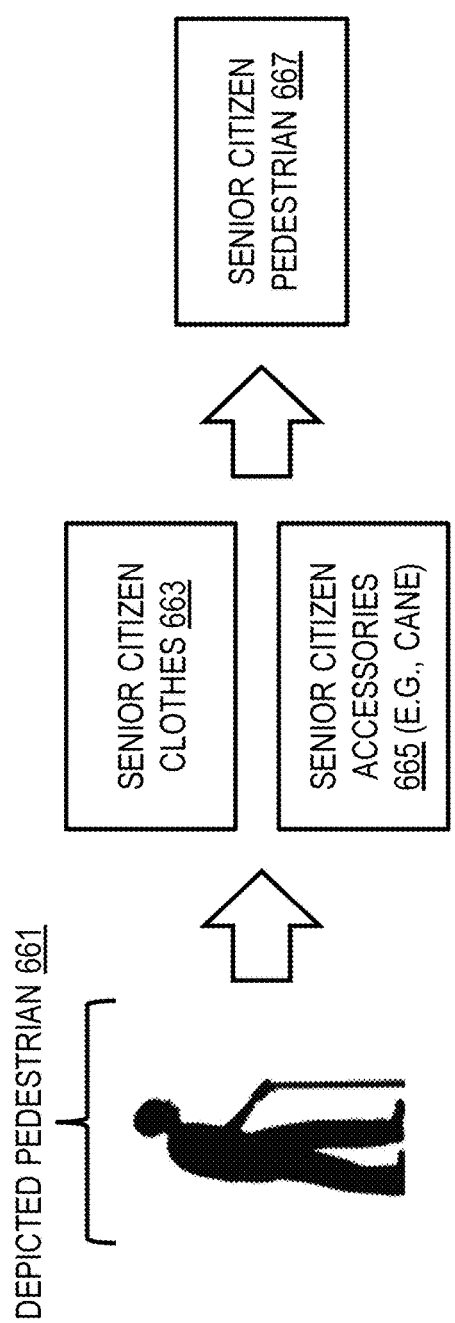
Figure 6E:
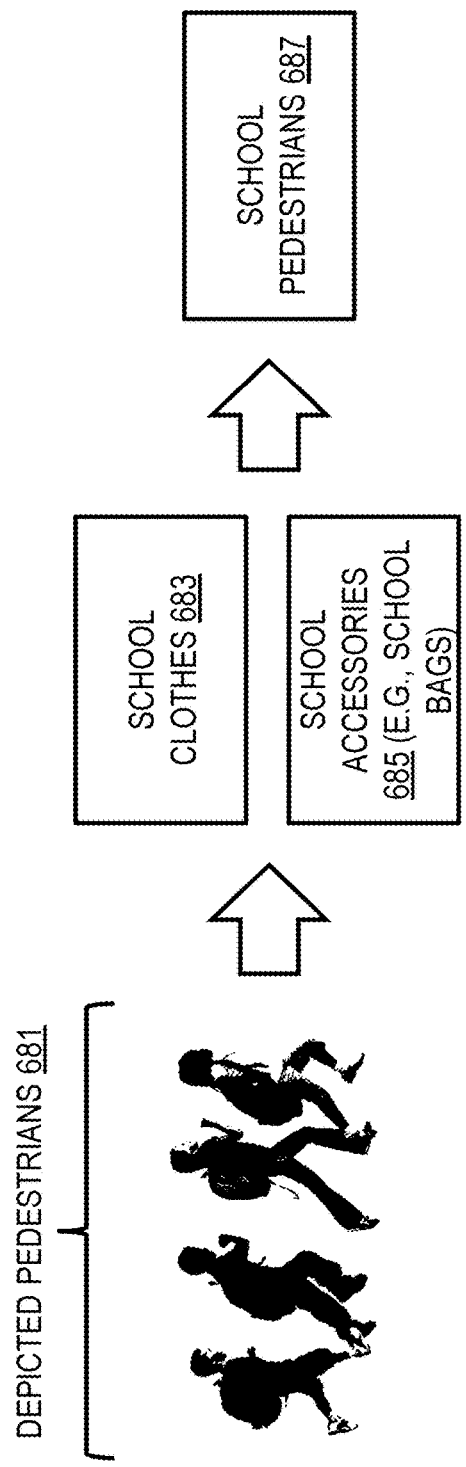

As discussed above, in one embodiment, the image processing module 405 processes the image data to identify a dress code (e.g., type of clothes and/or accessories being worn) of the at least one pedestrian. The pedestrian type can then be determined based on the dress code. FIGS. 6B-6D illustrate examples of determining pedestrian types based on pedestrian clothes detected from imagery. FIG. 6B illustrates an example image of pedestrians 621 that has been processed to indicate that the pedestrians 621 are wearing office clothes 623 and at least one is carrying an office accessory 625 (e.g., an office bag—briefcase). Based on this image analysis, the prediction module 407 has determined that the pedestrians 621 are classified as office worker pedestrians 627. FIG. 6C illustrates an example image of pedestrians 641 that has been processed to indicate that the pedestrians 641 are wearing construction clothes 643 and some carrying construction accessories 645 (e.g., construction tools). Based on this image analysis, the prediction module 407 has determined that the pedestrians 641 are classified as construction worker pedestrians 647. FIG. 6D illustrates an example image of a pedestrians 661 that has been processed to indicate that the pedestrian 661 is wearing senior citizen clothes 663 and carrying senior citizen accessories 665 (e.g., a cane). Based on this image analysis, the prediction module 407 has determined that the pedestrian 661 is classified as a senior citizen pedestrian 667. In the final example, FIG. 6E illustrates an example image of pedestrians 681 that has been processed to indicate that the pedestrians 681 are children wearing school clothes 683 and carrying accessories 685 (e.g., school bags). Based on this image analysis, the prediction module 407 has determined that the pedestrians 681 are classified as school pedestrians 687.

It is noted that although the examples of FIGS. 6B-6E discussed with respect to using the dress code and/or related dress accessories as a factor in predicting the corresponding pedestrian type, it is contemplated that in some embodiments, the prediction module 407 can use any other feature extracted from the image data 105 or related sources (e.g., the geographic database 101) as input features for predicting pedestrian type. Examples of these features are discussed above. For example, if the dress codes of pedestrians are not visible or otherwise detectable through computer vision, then any of the alternate features can be used to predict the pedestrian type.

By determining the pedestrian type, the prediction module 407 can also classify a corresponding geographic zone, area, location, route, POI, map feature, etc. based on the pedestrian types predicted from imagery of the area. In other words, the prediction module 407 can predict the zones based on the predicted pedestrian type and/or pedestrian features such as but not limited to dress codes like the type of dress, type of bags, types of shoes, etc. used by the pedestrians. For example, the predictive model or algorithm can be trained to determine that school bags and office bags are different. So, using this different, the prediction module 407 can identify and distinguish between school children and office going people in captured images of pedestrians. The same principle can be also be applied to other features such as, but not limited, to differences in clothing between different pedestrian types (e.g., school children wearing school uniforms/shoes, recreational/fitness pedestrians wearing sports shoes, etc.).

In one embodiment, the system 100 collects or processes such information data from image data 105 and then predicts which zone should be mapped using the location information associated with the image data 105. The mapping module 403, for instance, determines a geographic area, route, location, POI, map feature, and/or portions thereof associated with the image data 105 that has been classified based a pedestrian type. For example, returning to the examples of FIGS. 6B-6E, in FIG. 6B, the office worker classification 627 of the pedestrians 621 located in a geographic area can be used to generate, update, and/or verify the zone classification (e.g., zone data 117) for that given area to be an office worker zone. Similarly, the geographic area corresponding to the example of FIG. 6C can be mapped as a construction worker zone, the geographic area corresponding to the example of FIG. 6D can be mapped as a senior citizen zone, and the geographic area corresponding to the example of FIG. 6E can be mapped as a school zone.

In other words, in one embodiment (step 503), the prediction module 407 determines a classification of a geographic zone, geographic area, geographic route, and/or any other map feature of the geographic database 101 based on the detected pedestrian type. The mapping module 403 can align the location of the pedestrians identified in the image data 105 to a geographic area, location, route, POI, map feature, etc. In one embodiment, aligning refers to translating the apparent location of the pedestrians or image to a real-world location that corresponds to a position in the digital map data (e.g., link, node, map feature, POI, etc.) of the geographic database 101. The zone classification can then be referenced to or otherwise associated with the digital map data as a zone data record or equivalent data structure that relates the pedestrian-type derived zone classification to a geographic area, location, route, POI, map feature, etc. As previously discussed, the predicted zone classification can be used to generate a new zone data record for a given area or to update or verify an existing zone classification data record for the same area.

In one embodiment, the geographic extent over which the predicted zone classification applies can be determined based on the spatial distribution of the observed pedestrians of the corresponding pedestrian type. For example, a boundary can be drawn around the furthest extent of the observed pedestrians of a certain type. In another embodiment, the observed pedestrians can be spatially clustered (e.g., using k-means clustering or equivalent) to identify the corresponding boundary. In yet another embodiment, a default radius can be drawn around an observed pedestrian of a given pedestrian type to define the zone. It is contemplated that the above example processes for determining the geographic extent of a zone are provided by way of illustration and not as limitations.

Figure 7A:
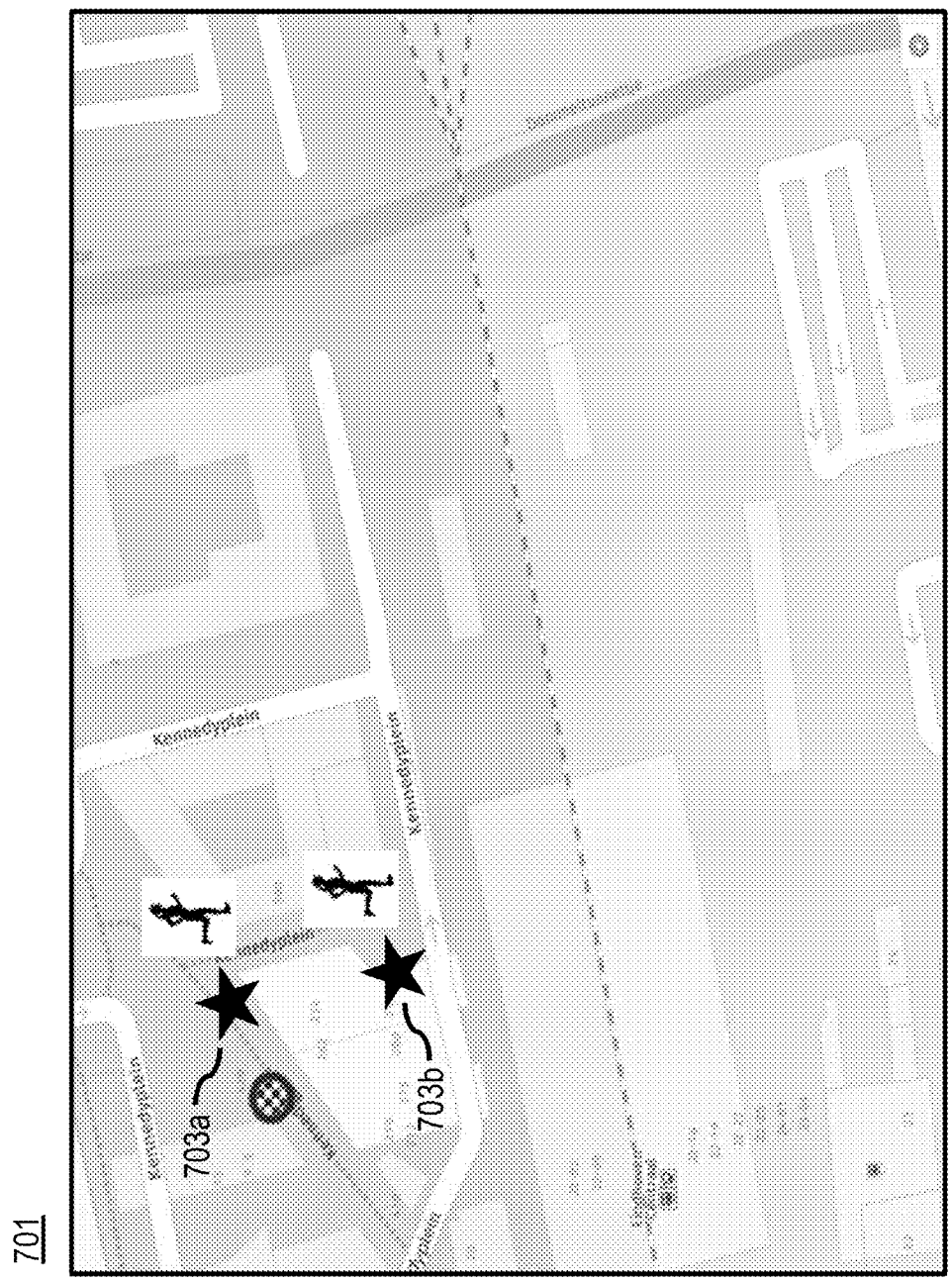
FIGS. 7A-7C are diagrams of example digital map representations of geographic zones classified according to a pedestrian type, according to one embodiment.
Figure 7B:
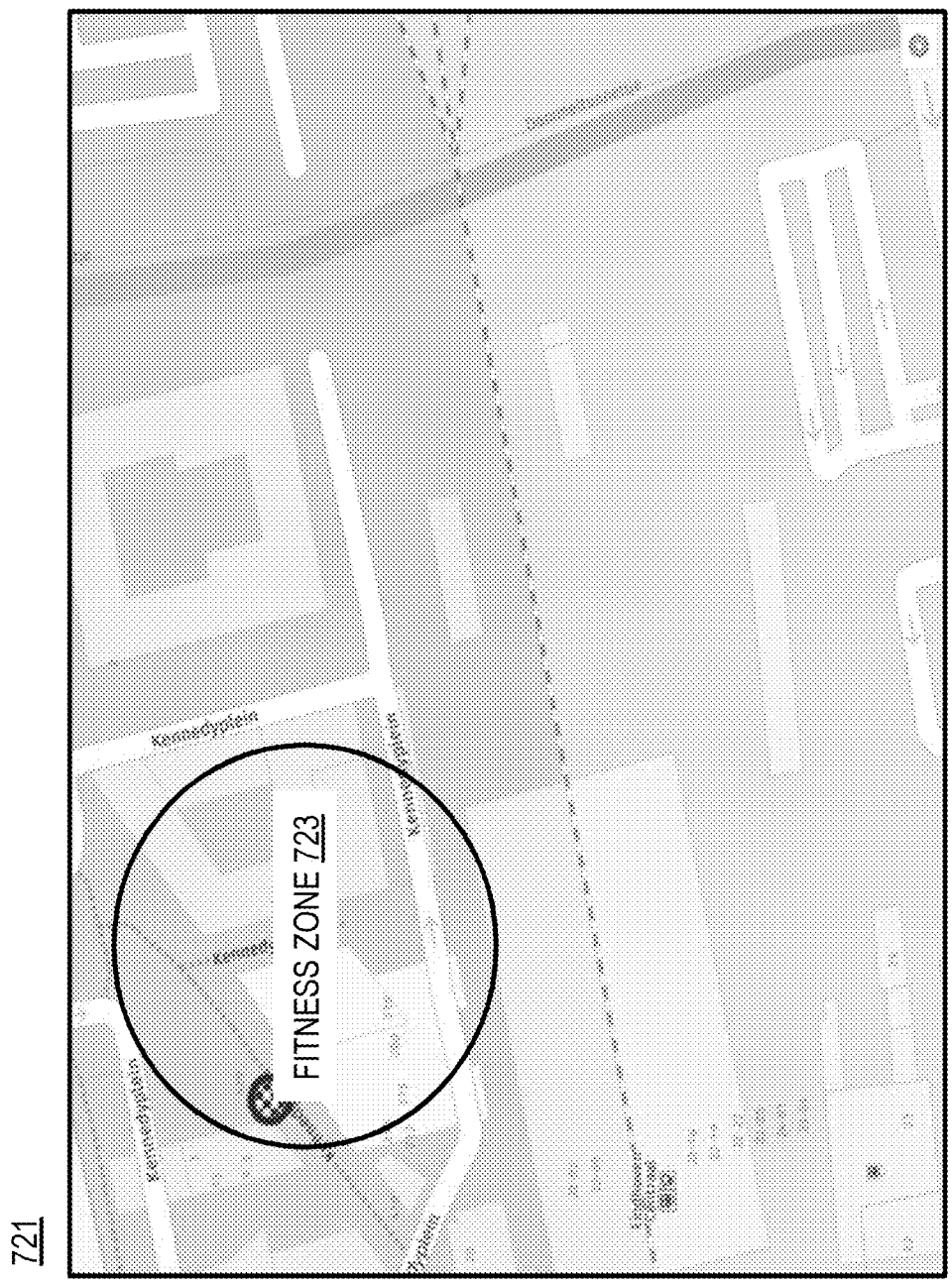
Figure 7C:
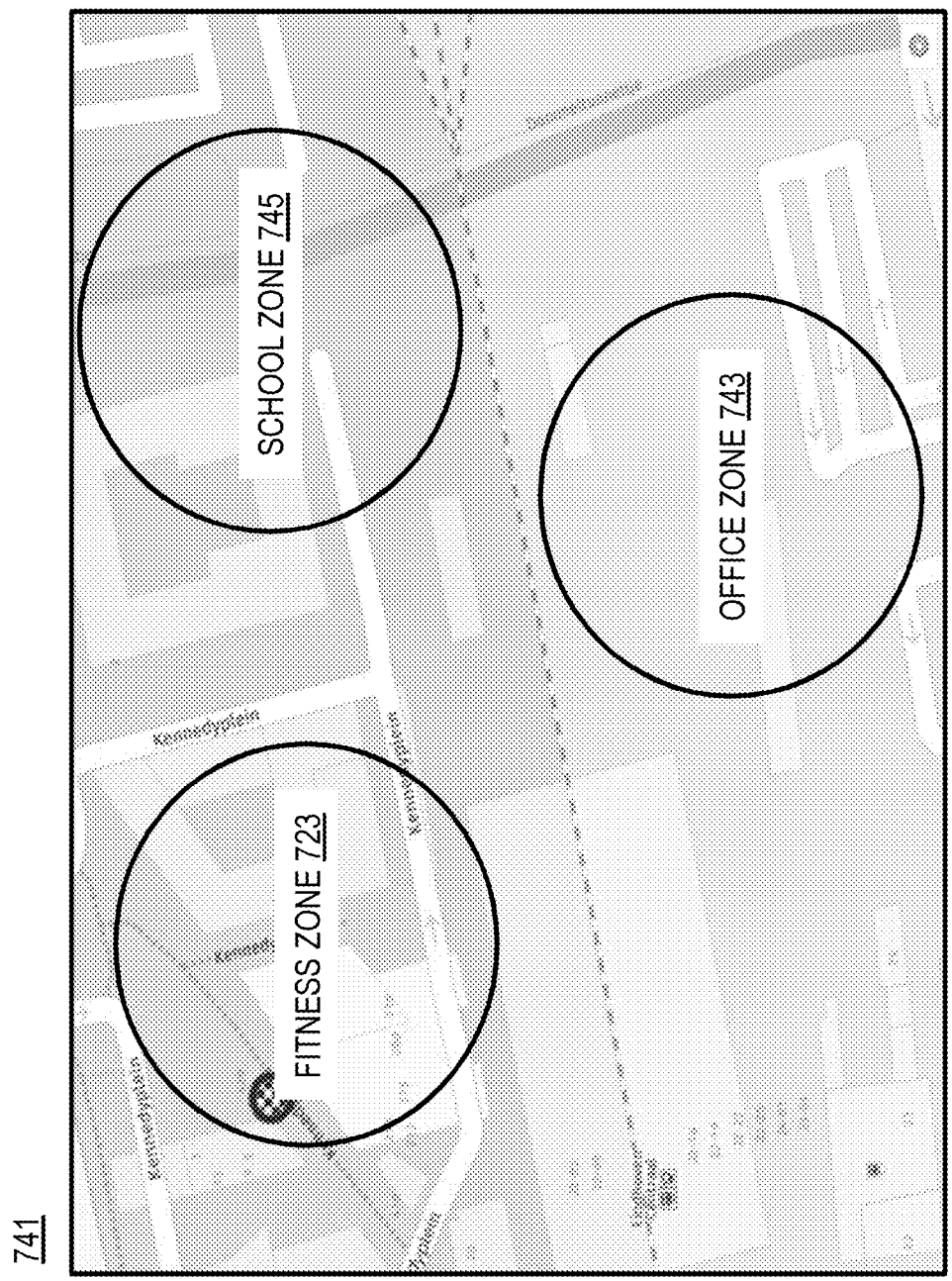

FIGS. 7A-7C are diagrams of example digital map representations of geographic zones classified according to a pedestrian type, according to one embodiment. As shown in FIG. 7A, a map 701 displays the locations 703a and 703b of pedestrians of a fitness pedestrian type that have been detected from image data 105. For example, street level imagery of pedestrians were captured at locations 703a and 703b and were processed (e.g., using computer vision) to detect that the depicted pedestrians are wearing fitness clothes associated with a person who is exercising or engaged in a fitness activity. In the map 721 of FIG. 7B, the mapping module 403 creates a fitness zone 723 around the observed locations of the fitness pedestrians and stores a digital representation of the fitness zone 723 in the digital map data of the geographic database 101. Once mapped, as shown map 741 of FIG. 7C, the fitness zone 723 can be presented along with other mapped zones (e.g., office zone 743 and school zone 745) previously stored in the geographic database 101.

In one embodiment, the prediction module 407 can use information on map features (e.g., POIs, places, etc.) associated with the geographic zone, geographic area, geographic route, etc. of interest (e.g., within a threshold proximity of a location of interest indicated by the image data) to further determine the classification of the pedestrian type used for zone generation. For example, the map feature is mapped or has been previously mapped to the geographic zone, geographic area, geographic route, etc. of interest. Then, if the several pedestrians visible in an image are classified tentatively as school pedestrians and the mapping module 403 determines that there is a school located with a threshold proximity (e.g., as indicated by the digital map data of the geographic database 101), the prediction module 407 may predict that the pedestrian type for the pedestrians is school pedestrians with higher confidence.

In one embodiment, the prediction module 407 determines contextual data associated with the image data, the at least one pedestrian, the geographic area, the route, or a combination thereof. The predicted classification can be further based on the contextual data. The contextual data includes, for instance, a temporal parameter, and wherein the classification is specified with respect to the temporal parameter. For example, if office worker pedestrians are detected during office hours, the predicted zone classification (e.g., office zone) can be made with higher confidence. Similarly, if school pedestrians are detected during school hours, the predicted school zone classification can also be made with higher confidence.

In one embodiment, the presence pedestrians of different pedestrian types can also be used to classify a particular zone. For example, different threshold composition ranges can be characteristic or indicative of different zone classifications. In other words, the image data depicts at least one other pedestrian associated with at least one other pedestrian type, and the classification is based on a combination of the pedestrian type and the at least one other pedestrian type. In an example use case, an observed mixture or combination of 50% adult pedestrians and 50% school children pedestrians might meet the composition range criteria associated with a school zone, when a combination of 20% adult pedestrians and 80% school children pedestrians might meet the composition range criteria for a more specific school playground zone.

In step 505, the mapping module 403 generates a digital map representation of the geographic zone geographic area, geographic route, and/or any other map feature based on the classification. In addition or alternatively, the mapping module 403 can use the identified pedestrian type to verify or update a classification of a map feature based on the classification predicted from image data. For example, the mapping module 403 can determine a map feature associated with the geographic zone, geographic area, geographic route, etc. corresponding to the image data, and then query the geographic database 101 for any existing classifications associated with the map feature. The verification can be performed by determining whether there is a match between the existing and newly predicted classifications for the map. If there is no match, the mapping module 403 can initiate an update of the existing classification based on the newly predicted classification. This updating can include, but is not limited to, replacing the existing classification with the newly predicted classification, marking the existing classification for further verification, using a heuristic or rule to determine whether to replace the existing classification with the newly predicted classification, and/or the like.

In one embodiment, the mapping module 403 can store or otherwise embed the classification data (e.g., zone data 117) in the geographic database 101 for publishing to end users or customers. In one embodiment, the zone data 117 can be stored as a data layer of the geographic database 101. The data layer can then be published separately or in combination with the digital map data of the geographic database while retaining its association to the underly map data of the geographic database 101.

In step 507, the output module 409 can provide any number of services and/or applications, or provide data to other components of the system 100 (e.g., the services platform 119, services 121, content providers 123, applications 115, etc.) to provide services and/or applications based on the zone data 117 predicted from pedestrian types identified from image data 105.

For example, the output module 409 or other services/applications can generate a location-based alert based on the classification, and then provide data for presenting the location-based alert on a device. In one example use case, a vehicle 111 is driving along a route. During the route, street-level imagery of construction workers working on an upcoming road segment has been captured by other vehicles. The system 100 processes the imagery and detects a significant number of pedestrians in the area whose clothing fit the criteria for classification as construction worker pedestrian types. Accordingly, the system 100 classifies the corresponding geographic area in which the construction worker pedestrians were observed as a construction zone and generated a map data record indicating a construction zone. As the vehicle 111 approaches the road segment and receives real-time map updates, the navigation system 801 (as shown in FIG. 8) of the vehicle 111 can display an alert message 803 indicating "Road Alert! Construction zone detected ahead. Please slow down." This can increase the safety of both the driver and passengers of the vehicle 111 and the construction workers in the zone.

In another example, the output module 409 or other services/applications can provide the digital map data (e.g., with embedded zone data 117) to control an operation of an autonomous vehicle, a highly assisted driving vehicle, or a combination thereof. For example, if the vehicle 111 above is an autonomous vehicle, the vehicle 111 can change its operational parameters (e.g., speed, route, etc.) in response to the detected construction zone. If safe autonomous operation cannot be maintained, the autonomous vehicle 111 can ask that the driver take over manual control or reroute to avoid the area entirely.

The vehicle 111, for instance, can be an autonomous vehicle or highly assisted driving vehicle that is capable of sensing its environment and navigating within a road network without driver or occupant input. It is noted that autonomous vehicles and highly assisted driving vehicles are part of a spectrum of vehicle classifications that can span from no automation to fully autonomous operation. For example, the U.S. National Highway Traffic Safety Administration ("NHTSA") in its "Preliminary Statement of Policy Concerning Automated Vehicles," published 2013, defines five levels of vehicle automation:

Level 0 (No-Automation)—"The driver is in complete and sole control of the primary vehicle controls— brake, steering, throttle, and motive power—at all times.";

Level 1 (Function-specific Automation)—"Automation at this level involves one or more specific control functions. Examples include electronic stability control or pre-charged brakes, where the vehicle automatically assists with braking to enable the driver to regain control of the vehicle or stop faster than possible by acting alone.";

Level 2 (Combined Function Automation)—"This level involves automation of at least two primary control functions designed to work in unison to relieve the driver of control of those functions. An example of combined functions enabling a Level 2 system is adaptive cruise control in combination with lane centering.";

Level 3 (Limited Self-Driving Automation)—"Vehicles at this level of automation enable the driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time."; and Level 4 (Full Self-Driving Automation)—"The vehicle is designed to perform all safety-critical driving functions and monitor roadway conditions for an entire trip. Such a design anticipates that the driver will provide destination or navigation input, but is not expected to be available for control at any time during the trip. This includes both occupied and unoccupied vehicles."

The various embodiments described herein are applicable to vehicles that are classified in any of the levels of automation (levels 0-4) discussed above. For example, in the case of autonomous modes of operation, the vehicle can automatically react to zone classifications (e.g., zone data 117). Even in the case of completely manual driving (e.g., level 0), the vehicle can present an alert or notification when traveling on road links for which the zone data 117 is available to provide greater situational awareness and improve safety for drivers and pedestrians.

Returning to FIG. 1, in one embodiment, the mapping platform 103 of system 100 has access to the image database 107 for storing image data 105 and/or the resulting zone data 117 generated based on the pedestrian types detected in the image data 105. In one embodiment, the mapping platform 103 also has connectivity to a geographic database 101 to provide location-based services based on the image data 105 and/or zone data 117. The mapping platform 103 can operate, for instance, in connection with the vehicles 111 and/or UEs 113 to provide mapping based on pedestrian type. Though depicted as automobiles, it is contemplated the vehicles 111 can be any type of transportation vehicle manned or unmanned (e.g., planes, aerial drone vehicles, motorcycles, boats, bicycles, etc.). Alternatively, the UE 113 may be a personal navigation device ("PND"), a cellular telephone, a mobile phone, a personal digital assistant ("PDA"), a watch, a camera, a computer and/or any other device that supports location-based services, e.g., digital routing and map display. It is contemplated that a device employed by a pedestrian may be interfaced with an onboard navigation system of a vehicle 111 or wirelessly/physically connected to the vehicle 111 to serve as the navigation system. Also, the UE 113 may be configured to access the communication network 109 by way of any known or still developing communication protocols to transmit and/or receive image data 105 and/or zone data 117.

Also, the vehicle 111 and/or UE 113 may be configured with an application 115 for collecting image data 105 and/or for interacting with one or more content providers 123, services 121 of a services platform 119, or a combination thereof. The application 115 may be any type of application that is executable on the vehicle 111 and/or UE 113, such as mapping applications, location-based service applications, navigation applications, content provisioning services, camera/imaging applications, media player applications, social networking applications, calendar applications, and the like. In one embodiment, the application 115 may act as a client for the mapping platform 103 and perform one or more functions of the mapping platform 103 alone or in combination with the mapping platform 103. In yet another embodiment, the content providers 123, services 121, and/or services platform 119 receive the zone data 117 generated by the mapping platform 103 for executing its functions and/or services.

The vehicle 111 and/or UE 113 may be configured with various sensors (not shown for illustrative convenience) for acquiring and/or generating image data 105 (e.g., street level imagery), probe or trajectory data associated with a vehicle 111, a driver, other vehicles, conditions regarding the driving environment or roadway, etc. For example, sensors may be used as GNSS/GPS receivers for interacting with one or more navigation satellites to determine and track the current speed, position and location of a vehicle travelling along a roadway. In addition, the sensors may gather other vehicle sensor data such as but not limited to tilt data (e.g., a degree of incline or decline of the vehicle during travel), motion data, light data, sound data, image data, weather data, temporal data and other data associated with the vehicle 111 and/or UEs 113. Still further, the sensors may detect local or transient network and/or wireless signals, such as those transmitted by nearby devices during navigation of a vehicle 111 along a roadway (Li-Fi, near field communication (NFC)) etc. This may include, for example, network routers configured within a premise (e.g., home or business), another UE 113 or vehicle 111 or a communications-capable traffic system (e.g., traffic lights, traffic cameras, traffic signals, digital signage, etc.).

It is noted therefore that the above described data may be transmitted via communication network 109 as image data 105, zone data 117, and/or probe data (e.g., trajectory data) according to any known wireless communication protocols. For example, each UE 113, mobile application 115, user, and/or vehicle 111 may be assigned a unique probe identifier (probe ID) or pseudonym for use in reporting or transmitting data collected by the vehicles 111 and UEs 113. In one embodiment, each vehicle 111 and/or UE 113 is configured to report probe data as probe points, which are individual data records collected at a point in time that records location data. Probes or probe points can be collected by the system 100 from the UEs 113, applications 115, and/or vehicles 111 in real-time, in batches, continuously, or at any other frequency requested by the system 100 over, for instance, the communication network 109 for processing by the mapping platform 103.

In one embodiment, the mapping platform 103 retrieves aggregated probe points gathered and/or generated by UE 113 resulting from the travel of UEs 113, and vehicles 111 on a road segment or other travel network (e.g., pedestrian paths, etc.). A probe database (not shown) can be used to store a plurality of probe points and/or trajectories (e.g., trajectory data) generated by different UEs 113, applications 115, vehicles 111, etc. over a period of time. A time sequence of probe points specifies a trajectory—i.e., a path traversed by a UE 113, application 115, vehicles 111, etc. over a period of time. In one embodiment, the trajectory data can be used for location alignment of the image data 105 captured by the corresponding vehicle 111 and/or UE 113.

In one embodiment, the communication network 109 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the mapping platform 103 may be a platform with multiple interconnected components. The mapping platform 103 may include multiple servers, intelligent networking devices, computing devices, components, and corresponding software for minding pedestrian and/or vehicle specific probe data from mix-mode probe data. In addition, it is noted that the mapping platform 103 may be a separate entity of the system 100, a part of the one or more services 121 of the services platform 119, or included within the UE 113 (e.g., as part of the applications 115).

In one embodiment, the content providers 123 may provide content or data (e.g., probe data) to the components of the system 100. The content provided may be any type of content, such as image data 105 and/or zone data 117, location data, textual content, audio content, video content, image content, etc. In one embodiment, the content providers 123 may also store content associated with the vehicles 111, the UE 113, the mapping platform 103, and/or the services 121. In another embodiment, the content providers 123 may manage access to a central repository of data, and offer a consistent, standard interface to data, such as a trajectories database, a repository of probe data, average travel times for one or more road links or travel routes (e.g., during free flow periods, day time periods, rush hour periods, nighttime periods, or a combination thereof), speed information for at least one vehicle, other traffic information, etc. Any known or still developing methods, techniques, or processes for retrieving and/or accessing trajectory or probe data from one or more sources may be employed by the mapping platform 103.

By way of example, the UE 113, application 115, vehicles 111, and mapping platform 103 communicate with each other and other components of the system 100 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
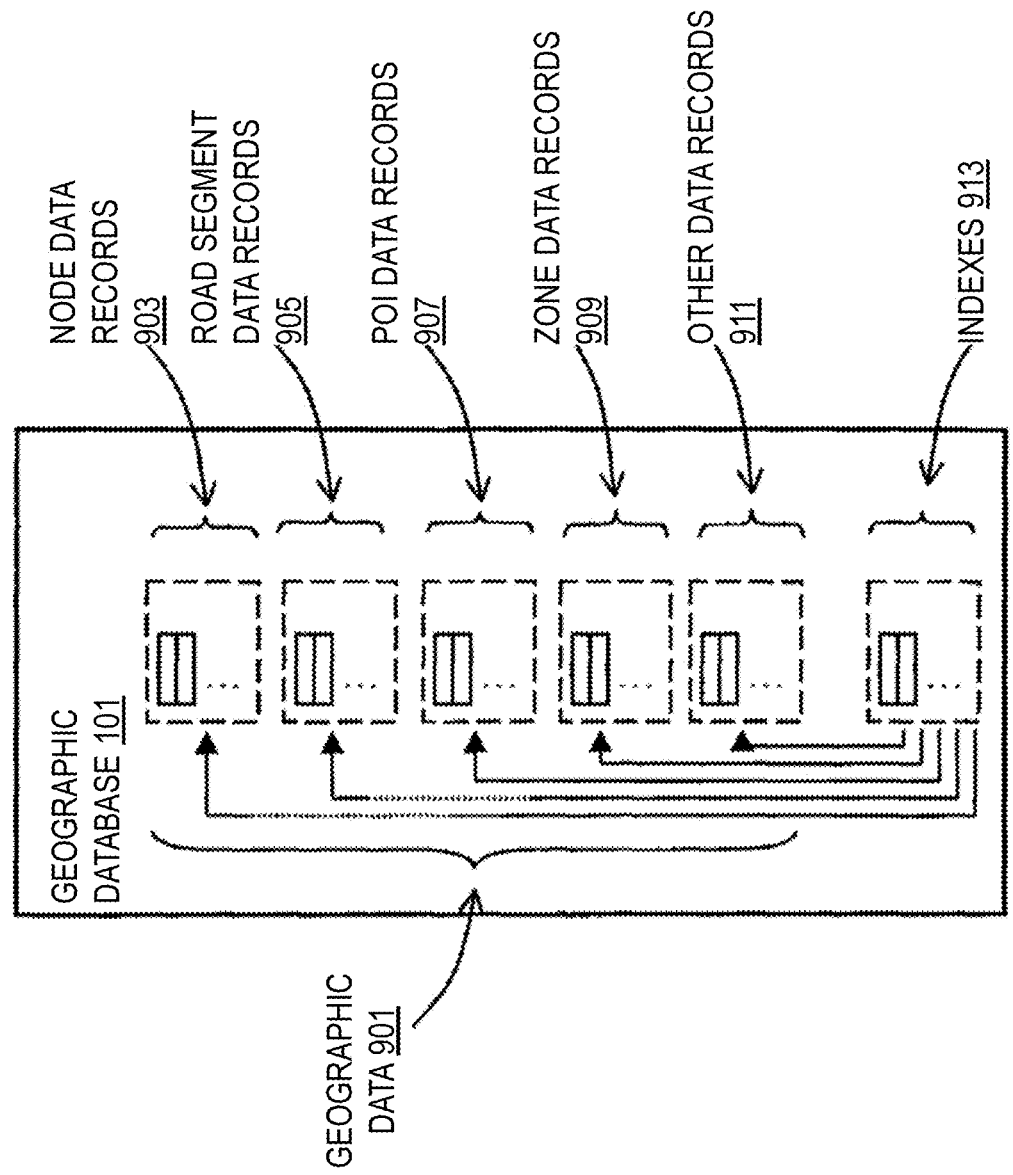
FIG. 9 is a diagram of a geographic database, according to one embodiment.

FIG. 9 is a diagram of the geographic database 101 of system 100, according to exemplary embodiments. In the exemplary embodiments, geographic zones, routes, trajectories (sequences of probe points), road segments, lane model information and/or other related information can be stored, associated with, and/or linked to the geographic database 101 or data thereof. In one embodiment, the geographic database 101 includes geographic data 901 used for (or configured to be compiled to be used for) mapping and/or navigation-related services, such as for personalized route determination, according to exemplary embodiments. For example, the geographic database 101 includes node data records 903, road segment or link data records 905, POI data records 907, zone data records 909, other data records 911, and indexes 913. More, fewer, or different data records can be provided. In one embodiment, the other data records 911 can include cartographic ("carto") data records, routing data, and maneuver data. In one embodiment, the indexes 913 may improve the speed of data retrieval operations in the geographic database 113. In one embodiment, the indexes 913 may be used to quickly locate data without having to search every row in the geographic database 113 every time it is accessed. One or more portions, components, areas, layers, features, text, and/or symbols of the zone data 117 can be stored in, linked to, and/or associated with one or more of these data records. For example, one or more portions of the zone classifications of the zone data 117 can be matched with respective map or geographic records via position or GPS data associations (such as using known or future map matching or geo-coding techniques).

In exemplary embodiments, the road segment data records 905 are links or segments representing roads, streets, or paths, as can be used in the calculated route or recorded route information for determination of one or more personalized routes, according to exemplary embodiments. The node data records 903 are end points corresponding to the respective links or segments of the road segment data records 905. The road link data records 905 and the node data records 903 represent a road network, such as used by vehicles, cars, and/or other entities. Alternatively, the geographic database 101 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 101 can include data about the POIs and their respective locations in the POI data records 907. The geographic database 101 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In addition, the geographic database 101 can include zone data records 909 for image data 105, zone data 117, and/or any other related data used in the embodiments of mapping based on pedestrian type described herein.

The geographic database 101 can be maintained by the content provider 123 in association with the services platform 119 (e.g., a map developer). The map developer can collect geographic data to generate and enhance the geographic database 101. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 101 can be a master geographic database stored in a format that facilitates updating, maintenance, and development. For example, the master geographic database 101 or data in the master geographic database 101 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 113. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 101 can be a master geographic database, but in alternate embodiments, the geographic database 101 can represent a compiled navigation database that can be used in or with end user devices (e.g., vehicle 111, UE 113, etc.) to provide navigation-related functions (e.g., functions based on zone data 117). For example, the geographic database 101 can be used with the end user device to provide an end user with navigation features. In such a case, the geographic database 101 can be downloaded or stored on the end user device (e.g., vehicle 111, UE 113, etc.), such as in application 115, or the end user device can access the geographic database 101 through a wireless or wired connection (such as via a server and/or the communication network 109), for example.

The processes described herein for mapping based on pedestrian type may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
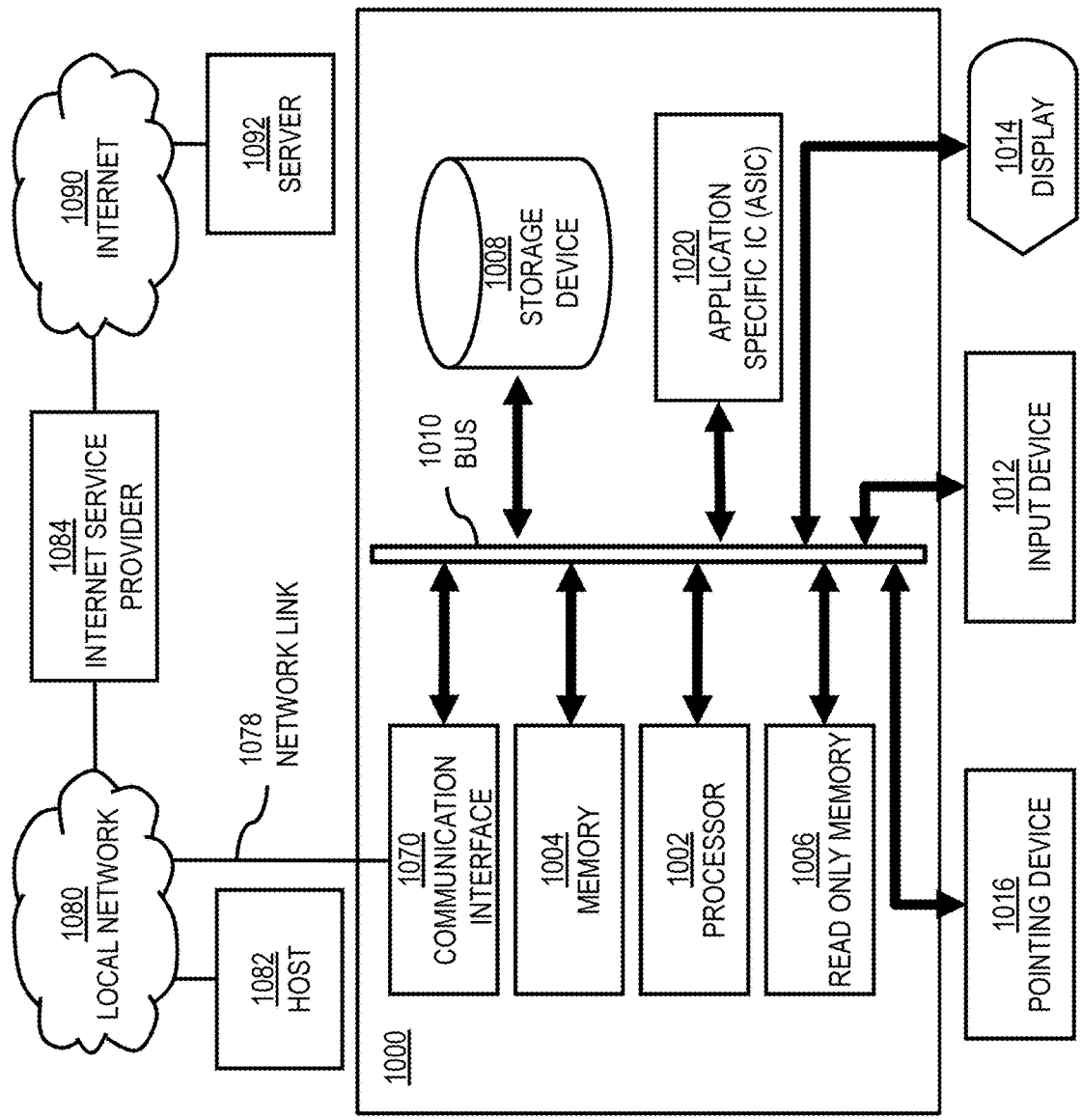
FIG. 10 is a diagram of hardware that can be used to implement an embodiment.

FIG. 10 illustrates a computer system 1000 upon which an embodiment of the invention may be implemented. Computer system 1000 is programmed (e.g., via computer program code or instructions) to map based on pedestrian type as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to mapping based on pedestrian type. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RANI) or other dynamic storage device, stores information including processor instructions for mapping based on pedestrian type. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for mapping based on pedestrian type, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general, the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives, or both sends and receives electrical, acoustic, or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 109 for mapping based on pedestrian type.

The term computer-readable medium is used herein to refer to any medium that participates in providing information to processor 1002, including instructions for execution. Such a medium may take many forms, including, but not limited to, non-volatile media, volatile media, and transmission media. Non-volatile media include, for example, optical or magnetic disks, such as storage device 1008. Volatile media include, for example, dynamic memory 1004.

Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system can be deployed in various configurations within other computer systems, e.g., host 1082 and server 1092.

FIG. 11 illustrates a chip set 1100 upon which an embodiment of the invention may be implemented. Chip set 1100 is programmed to map based on pedestrian type as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to map based on pedestrian type. The memory 1105 also stores the data associated with or generated by the execution of the inventive steps.

Figure 12:
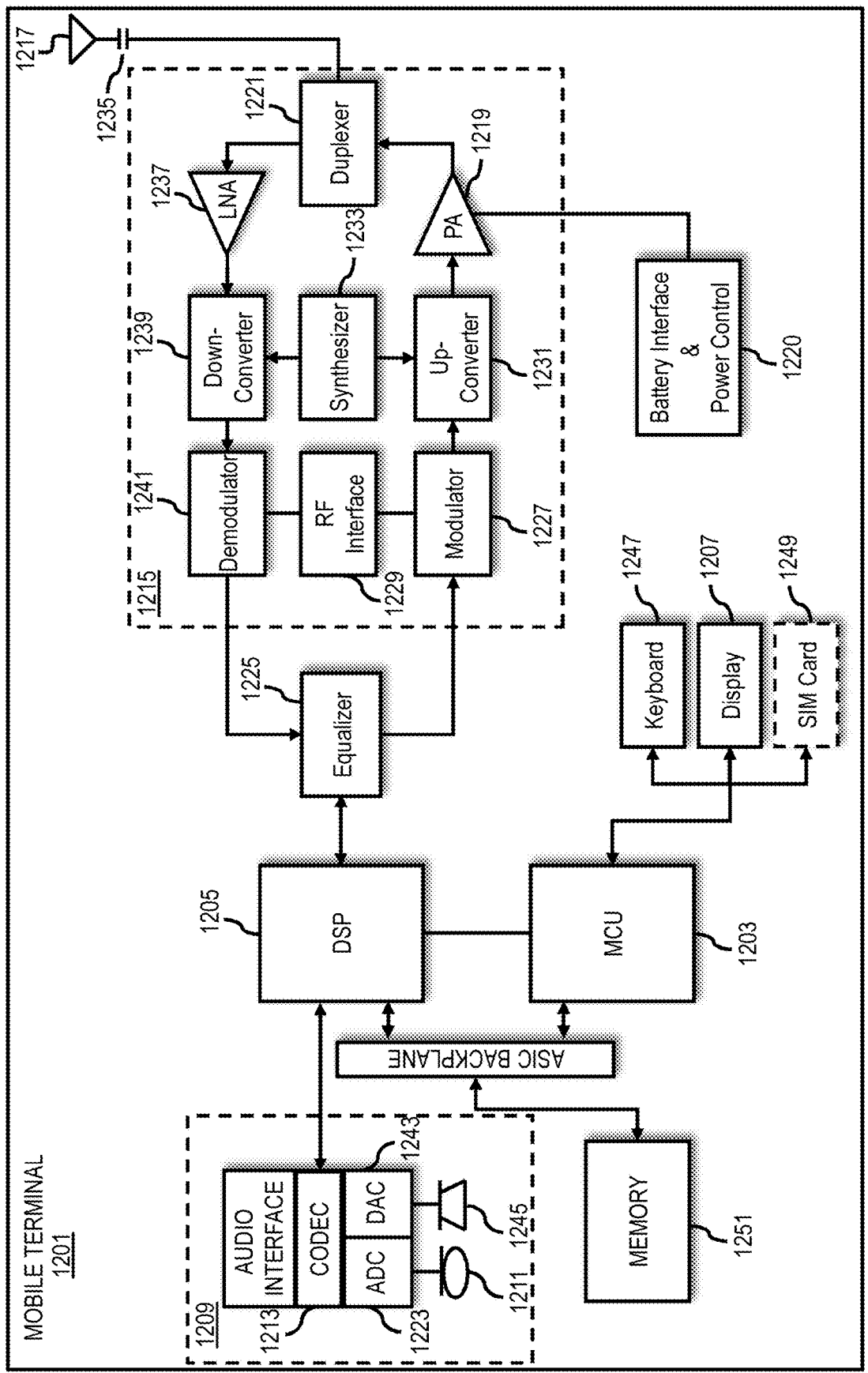
FIG. 12 is a diagram of a mobile terminal (e.g., mobile device, vehicle, or component thereof) that can be used to implement an embodiment.

FIG. 12 is a diagram of exemplary components of a mobile terminal (e.g., a vehicle 111, UE 113, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/ modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to map based on pedestrian type. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for mapping based on a pedestrian type comprising:
  processing real-time image data from one or more camera-equipped vehicle or camera-equipped user equipment to determine the pedestrian type of two or more pedestrians depicted in the image data, wherein the image data is processed by a computer processor to identify a dress code of the two or more pedestrians, wherein the pedestrian type of the two or more pedestrians is identified by the dress code of the pedestrians;
  determining at least a portion of a geographic zone associated with the image data wherein a boundary of the geographic zone is determined based on the spatial distribution of observed pedestrians of two or more determined pedestrian types;
  determining a classification of the geographic zone based on the two or more detected pedestrian types; and
  generating digital map data that represents the geographic zone and the classification, wherein the classification is stored in a data layer of a geographic database.

2. The method of claim 1, further comprising:
  determining a map feature associated with the geographic zone, wherein the classification is further based on the map feature.

3. The method of claim 2, wherein the map feature is a point of interest mapped to the geographic zone.

4. The method of claim 1, further comprising:
determining a map feature associated with the geographic zone; and
verifying or updating an existing classification of the map feature based on the classification.

5. The method of claim 1, further comprising:
determining contextual data associated with the image data, the at least one pedestrian, and the geographic zone,
wherein the classification is further based on the contextual data.

6. The method of claim 5, wherein the contextual data includes a temporal parameter, and wherein the classification is specified with respect to the temporal parameter.

7. The method of claim 1, further comprising:
generating a location-based alert based on the classification; and
providing data for presenting the location-based alert on a device.

8. The method of claim 1, further comprising:
providing the digital map data to control an operation of an autonomous vehicle, a highly assisted driving vehicle, or a combination thereof.

* * * * *